United States Patent
Kamoi et al.

(10) Patent No.: US 6,839,426 B1
(45) Date of Patent: Jan. 4, 2005

(54) ECHO CANCELLOR

(75) Inventors: Hideki Kamoi, Tokyo (JP); Hiroki Gouko, Tokyo (JP); Yoshio Sakata, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/478,545

(22) Filed: Jan. 6, 2000

(30) Foreign Application Priority Data

Jan. 20, 1999 (JP) ............................................ 11-011426

(51) Int. Cl.[7] ........................... H04M 1/00; H04M 9/00; H04M 9/08
(52) U.S. Cl. ............................ 379/406.01; 379/406.04; 379/406.08; 379/406.05
(58) Field of Search ....................... 379/387.01–392.01, 379/406.01–406.16

(56) References Cited

U.S. PATENT DOCUMENTS 5,007,044 A * 4/1991 Miyoshi et al.
5,828,589 A * 10/1998 Degenhardt ................. 708/322
6,212,273 B1 * 4/2001 Hemkumar et al.

* cited by examiner

Primary Examiner—Duc Nguyen
(74) Attorney, Agent, or Firm—Volentine Francos & White, PLLC

(57) ABSTRACT

An echo cancellor having a main tap coefficient holding section to renew a tap coefficient used to establish a pseudo transmission characteristic of an echo path and a sub tap coefficient holding section to make a copy of a tap coefficient held by the main tap coefficient holding section and to hold it. The copying is made each time an echo suppressing rate is increased. Accordingly, a tap coefficient having a high echo suppressing rate is held by the sub tap coefficient holding section. In this state, if an ambient noise such as an alarm of whistle of a vehicle is mixed, renewal operation of the main tap coefficient holding section is halted and a tap coefficient held by the sub tap coefficient holding section is used. Even in the case of a divergence of the main tap coefficient, normal operation can be maintained by the tap coefficient held by the sub tap coefficient holding section accordingly.

14 Claims, 6 Drawing Sheets

ECHO CANCELLOR

BACKGROUND OF THE INVENTION

1. Field of the Invention

The present invention relates to an echo cancellor and more particularly to an echo cancellor employing an adaptive digital filter in a communication system.

2. Description of the Related Art

In the conventional echo cancellor using an adaptive digital filter, echo noises are suppressed in a manner described below.

First, an impulse response of an echo path is obtained. On the basis of this result, a pseudo transmission path is established using a transversal filter provided within the adaptive digital filter. This pseudo transmission path is constructed by setting a tap coefficient of the transversal filter. Next, part of a sending signal is inputted in the transversal filter and a pseudo echo mimicking echo noises is acquired from an output from the transversal filter.

The echo noise is suppressed by subtracting this pseudo echo from the sending signal. Since the impulse response of the echo path is changed in some cases, tracing is performed by altering the tap coefficient. The echo noise refers to a noise mixed in the sending signal which is generated when, for example, in a hand-free car phone, a receiving voice emitted from a speaker is reflected off window glass, side walls and the like in a car and, after passing through two or more paths, is received by a microphone. The echo path is a general term of two or more paths for the receiving voice.

However, there are problems as described below to be solved in the conventional echo cancellor. That is, if an ambient noise such as a voice of a user other than those using the hand-free car phone or an alarm of whistle in a vehicle is mixed in the receiving signal, since its transmission path cannot be estimated and tracing using the tap coefficient is impossible, it is difficult to suppress such echo noises accordingly. Moreover, there may be some cases where the tap coefficient diverges, causing the occurrence of a foreign sound.

SUMMARY OF THE INVENTION

In view of the above, it is an object of the present invention to provide an echo cancellor which can provide suppression of an echo noise from communication signals even if an ambient noise is mixed in the signal.

According to a first aspect of the present invention, there is provided an echo cancellor for suppressing an echo noise, caused by an echo produced by passage of a voice through an echo path used as a specified path for the voice, mixed in a sending signal comprising:

an adaptive digital filter to capture a tap coefficient used to mimic a transmission characteristic responsive to the echo path, to establish a pseudo transmission characteristic based on the tap coefficient, to output a pseudo echo for canceling the echo noise and to calculate and output a new tap coefficient on the basis of a residual amount of the echo noise existing after the cancellation;

a main tap coefficient holding section to renew and hold the new tap coefficient for supplying it to the adaptive digital filter;

a sub tap coefficient holding section to hold a tap coefficient used to mimic a transmission characteristic being able to be responsive to the echo path;

an ambient noise detecting means to detect ambient noises mixed in the sending signal and to output a detection signal; and a means to have the adaptive digital filter capture the tap coefficient held by the sub tap coefficient holding section when the detection signal is received.

In the foregoing, a preferable mode is one wherein a means adapted to judge a residual amount of noises is additionally provided which is used to have the sub tap coefficient holding section hold the tap coefficient held by the main tap coefficient holding section each time when a residual amount of the echo noise existing after cancellation between the echo noise and the pseudo echo becomes small.

Also, a preferable mode is one wherein it is provided with a means to judge a residual amount of noises used to have the sub tap coefficient holding section hold the tap coefficient held by the main tap coefficient holding section each time when a residual amount of the echo noise existing after cancellation between the echo noise and the pseudo echo becomes small, and additionally with an echo path change detecting mean to detect variation of the echo noise caused by a change in the state of the echo path and to control the means for judging the residual amount of noises for having the sub tap coefficient holding section hold the tap coefficient held by the main tap coefficient holding section.

Furthermore, a preferable mode is one wherein the sub tap coefficient holding section captures the tap coefficient held by the main tap coefficient holding section when receiving a tap coefficient change signal from outside.

According to a second aspect of the present invention, there is provided an echo cancellor for suppressing an echo noise, caused by an echo produced by passage of a voice through an echo path used as a specified path for the voice, mixed in a sending signal comprising:

an adaptive digital filter to capture two tap coefficients used to mimic a transmission characteristic responsive to the echo path, to establish two pseudo transmission characteristics based on each of the tap coefficient, to output a main pseudo echo and a sub pseudo echo used to cancel the echo noise and calculate and output a new tap coefficient on the basis of the residual amount of the echo noise existing after cancellation between the echo noise and the main pseudo echo noise;

a main tap coefficient holding section to renew and hold the new tap coefficient as one tap coefficient used to have the adaptive digital filter output the main pseudo echo;

a sub tap coefficient holding section to hold another tap coefficient used to have the adaptive digital filter output the sub pseudo echo;

a sending signal judging means to compare the sending signal with the echo noise canceled by the main pseudo echo with the sending signal with the echo noise canceled by the sub pseudo echo for selecting and outputting a sending signal having a small residual amount of the echo noises, and to have the sub tap coefficient holding section hold the tap coefficient held by the main tap coefficient holding section each time when selecting the sending signal with the echo noise canceled by the main pseudo echo;

an ambient noise detecting means to detect ambient noises mixed in the sending signal and to output a detection signal; and a control means to have the adaptive digital filter capture the tap coefficient held by the sub tap coefficient holding section when receiving the detection signal.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

First Embodiment

The echo cancellor of the present invention is provided with a main tap coefficient holding section to renew a tap coefficient used to set a pseudo transmission characteristic of an echo path and to hold it and with a sub tap coefficient holding section to copy the tap coefficient held by the main tap coefficient holding section and to hold it. The copying is carried out each time an echo suppressing rate increases. Therefore, in the sub tap coefficient holding section is always held the tap coefficient having the high echo suppressing rate. If an ambient noise such as an alarm whistle of a vehicle is mixed in a sending signal, the renewal of the tap coefficient is halted and the tap coefficient held in the sub tap coefficient holing section is used.

Figure 1:
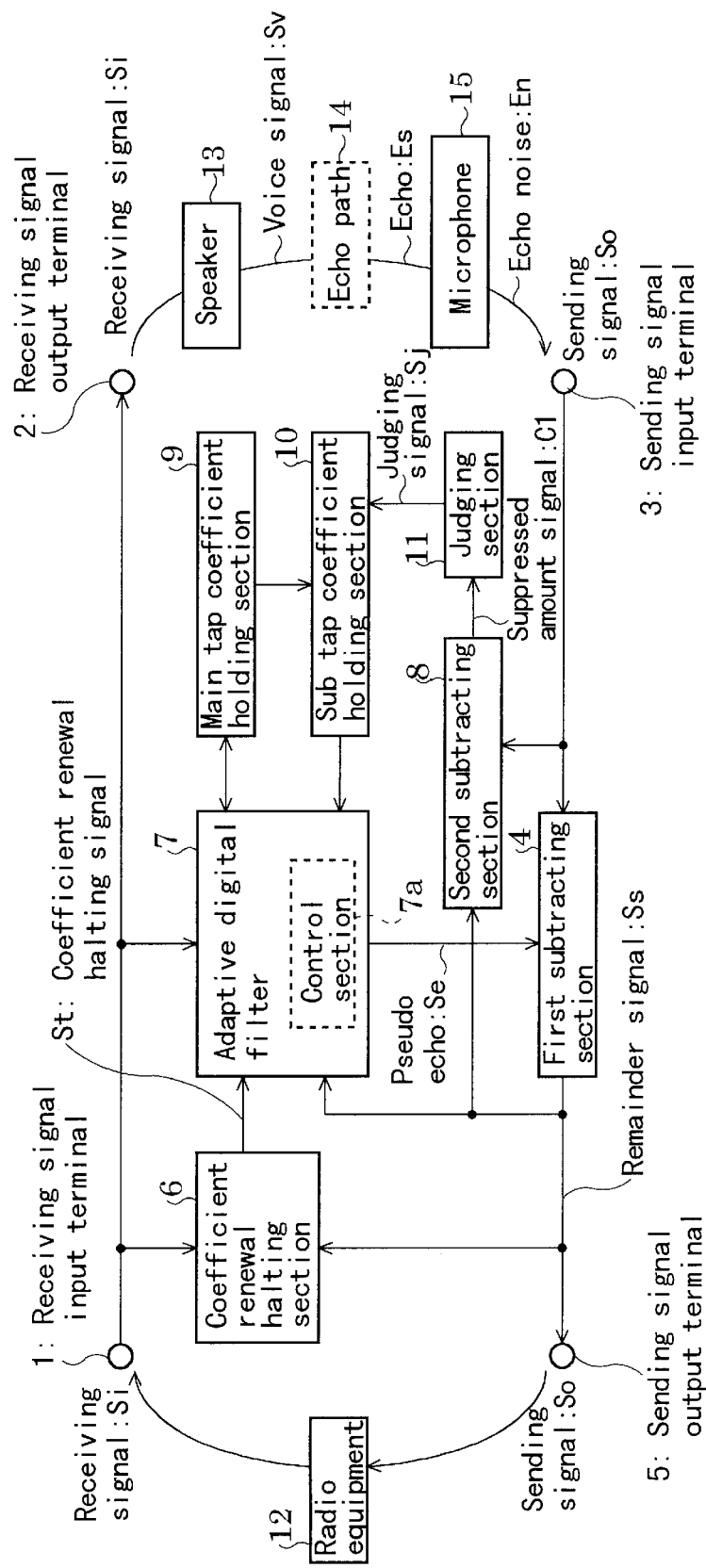
FIG. 1 is a block diagram showing the echo cancellor according to a first embodiment of the present invention.

FIG. 1 is a block diagram showing the echo cancellor according to the first embodiment of the present invention. As depicted in FIG. 1, the echo cancellor of this embodiment is comprised of a receiving signal input terminal 1, a receiving signal output terminal 2, a sending signal input terminal 3, a first subtracting section 4, a sending signal output terminal 5, a coefficient renewal halting section 6, an adaptive digital filter 7, a second subtracting section 8, a main tap coefficient holding section 9, a sub tap coefficient holding section 10 and a judging section 11. The receiving signal input terminal 1 is an input terminal to receive a receiving signal Si from, for example, radio equipment 12.

The receiving signal output terminal 2 is a terminal to transfer the receiving signal Si to an electroacoustic converting device such as a speaker. The receiving signal Si is converted to a voice Sv by the electroacoustic converting device (speaker) 13. In the case of a car phone, for example, the voice Sv emitted in a car and, after being reflected off window glass, walls of body work or the like and after passing through two or more paths is changed to an echo Es. The echo Es is converted to an echo noise En by another electroacoustic converting device such as a microphone 15 and is mixed into a sending signal So.

The sending signal input terminal 3 is an input terminal to receive a sending signal So from the electroacoustic converting device such as the microphone 15. The first subtracting section 4 is a component used to subtract a pseudo echo Se supplied by the adaptive digital filter from the sending signal So containing the echo noise En inputted into the sending signal input terminal 3.

The sending signal output terminal 5 is an output terminal to transfer the sending signal So, for example, to the radio equipment 12 or the like.

The coefficient renewal halting section 6, when a noise other than the echo noise En, for example, an ambient noise such as an alarm whistle of a vehicle or the like is mixed in the sending signal So, i.e., when an abnormal state occurs, is used to output a coefficient renewal halting signal St to have the adaptive digital filter halt an operation of renewing the tap coefficient.

The adaptive digital filter 7 is adapted to estimate an impulse response of the echo path, i.e., a transmission characteristic used to generate and output the pseudo echo Se being closely analogous to the echo noise. That is, a control section 7a is adapted to capture the tap coefficient and to mimic the transmission characteristic of a transversal filter stored therein. The transversal filter then generates the pseudo echo Se being analogous to the echo noise En by using part of the receiving signal Si as an input signal. A computation is performed on the tap coefficient set in the above transversal filter by the control section 7a on the basis of a remainder signal Ss described later.

The second subtracting section 8 is used to subtract an output signal fed by the first subtracting section from the sending signal So containing the echo noise En to obtain a suppressed amount signal CI and to transfer it to the judging section 11. herefore, a power level of the suppressed amount signal CI is indirectly proportional to that of a residual amount of the echo noise En contained in the sending signal So to be transferred from the sending signal So output terminal 5 to the radio equipment.

The main tap coefficient holding section 9 is used to supply the tap coefficient to the adaptive digital filter 7 and at the same time to hold a value of the tap coefficient each time the control section 7a of the adaptive digital filter 7 performs the computation thereon.

The sub tap coefficient holding section 10 is adapted to capture the tap coefficient held by the main tap coefficient holding section 9 and to hold it at each time of receiving a judging signal Sj from the judging section 11. At the time of mixture of the ambient noise, the tap coefficient is supplied to the adaptive digital filter instead of the main tap coefficient holding section 9. The judging section 11 holds a present maximum suppressed amount signal CI, compares this signal CI with a suppressed amount signal CI fed from the second subtracting section 8, outputs the judging signal Sj to the sub tap coefficient holding section 10 each time the residual amount of the echo noise En becomes smaller and the suppressed amount signal CI becomes larger, renews this large suppressed amount signal CI and holds it.

Operations of the echo cancellor of this embodiment are described below. Let it be assumed that the receiving signal input terminal 1 has received the receiving signal Si from the radio equipment 12. When this receiving signal Si is transferred to the receiving signal output terminal 2 and is emitted through the speaker 13, part of the voice signal passes through the echo path 14 and becomes an echo Es. This echo is received by the microphone and becomes an echo noise En. This echo noise En is mixed in the sending signal So and supplied to the first subtracting section 4. In the adaptive digital filter 7, a transmission characteristic of the echo path 14 is mimicked on the basis of the set tap coefficient, i.e., on the basis of the tap coefficient held by the main tap coefficient holding section 9. Therefore, the adaptive digital filter having the mimicked transmission characteristic is adapted to generate the pseudo echo Se and to supply it to the first subtracting section 4.

The first subtracting section 4 is used to subtract the pseudo echo Se from the sending signal So mixed with the echo noise En and to transfer the sending signal So to the radio equipment 12 through the sending signal So output terminal 5. The signal obtained by subtracting the pseudo echo Se from the sending signal So mixed with the echo noise En is hereinafter defined as a remainder signal. Part of this remainder signal Ss is supplied to both the adaptive digital filter 7 and the second subtracting section 8.

In the adaptive digital filter 7, the control section 7a, when the remainder signal Ss is inputted, performs a computation on the tap coefficient by referring to the receiving signal Si. The tap coefficient obtained by the computation is held by the main tap coefficient holding section 9 and is used for subsequent mimicking of a transmission characteristic of the echo path 14. The renewal of the tap coefficient is continued through repetition of similar operations.

Next, when the remainder signal Ss is supplied, the second subtracting section 8 is adapted to subtract this remainder signal Ss from the sending signal So mixed with the echo noise En. The resulting suppressed amount signal CI obtained by the subtraction is transferred to the judging section 11. The judging section 11 is used to compare one transferred suppressed amount signal CI with the other held suppressed amount signal CI and, if the transferred signal CI is larger than the held signal CI, it outputs a judging signal Sj to the sub tap coefficient holding section 10. The sub tap coefficient holding section 10, when this judging signal Sj is inputted, captures the tap coefficient held by the main tap coefficient holding section 9 and holds it.

By repeating operations described above, the residual amount of the echo noise En contained in the remainder signal Si continues to rapidly decrease. That is, the echo suppressing rate of the echo cancellor reaches the maximum limit. The echo suppressing rate represents the probability that the echo noise En is not contained in the sending signal So. Accordingly, the sub tap coefficient holding section 10 holds the tap coefficient obtained when the echo suppressing rate reaches the maximum limit.

Let it be assumed that the sub tap coefficient holding section 10 holds the tap coefficient obtained when the echo suppressing rate extremely reaches the maximum limit and that, in this state, an ambient noise such as an alarm whistle of a vehicle or the like is mixed in the sending signal So. Since the ambient noise such as the alarm whistle of the vehicle is not suppressed in the first subtracting section 4, it is mixed in the remainder signal Ss and the resulting mixed signal is supplied to the adaptive digital filter. As a result, a tap coefficient affected by the ambient noise is held in the main tap coefficient holding section 9 or the tap coefficient is diverged at the worst. The coefficient renewal halting section 6 detects such ambient noises including the alarm whistle of the vehicle and outputs the coefficient renewal halting signal St to the adaptive digital filter 7. When the adaptive digital filter 7 receives the coefficient renewal halting signal St, the internal control section 7a stops a computation performed on the basis of the remainder signal even if it is inputted. As a result, the tap coefficient appeared before the occurrence of the ambient noise is held in the main tap coefficient holding section 9.

While the adaptive digital filter 7 is receiving the coefficient renewal halting signal St, since its control section 7a is adapted to capture the tap coefficient held by the sub tap coefficient holding section 10, a pseudo echo Se based on the tap coefficient is generated and outputted.

The above description is made provided that the sub tap coefficient holding section 10 holds the tap coefficient having reached the maximum echo suppressing rate. The present invention is not limited to this state. That is, even if the echo suppressing rate is low, operations are continued on the basis of the tap coefficient held at the present time by the sub tap coefficient holding section 10.

Moreover, the above description is also made assuming that the state of the echo path remains unchanged. However, there may be a case where the echo path 14 is changed suddenly during operations of the echo cancellor. In this case, the sub tap coefficient holding section 10 continues holding the tap coefficient corresponding to the state of the echo path that has not undergone any change.

Figure 2:
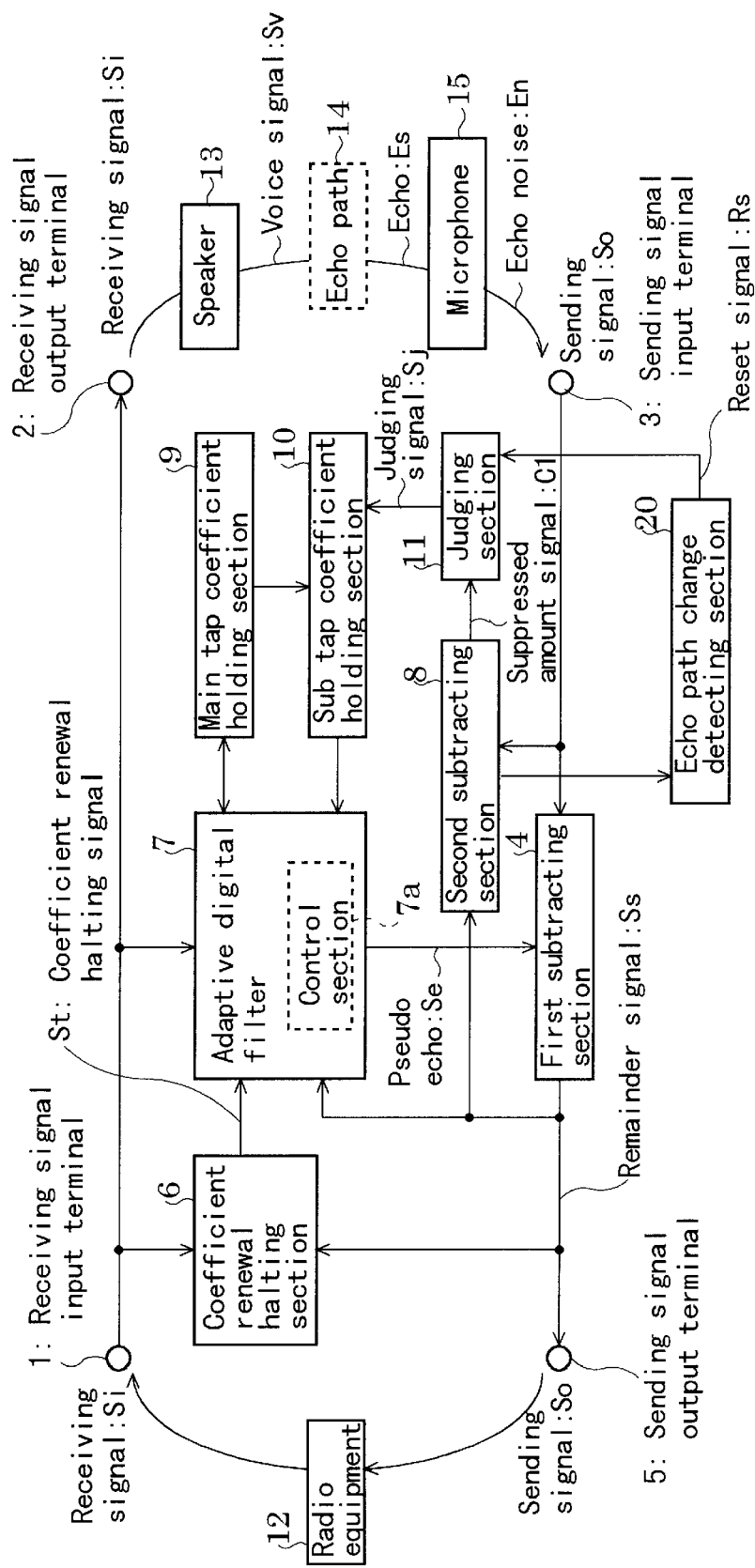
FIG. 2 is a block diagram showing a modified example of the echo cancellor according to the first embodiment.

FIG. 2 is a block diagram showing a modified example of the echo cancellor according to the first embodiment. As depicted in FIG. 2, the modified echo cancellor is additionally provided with an echo path change detecting section 20 connected to a second subtracting section 8 and its output is connected to a judging section 11. The echo path change detecting section 20 is used to monitor the second subtracting section 8 and, if a power level of a suppressed amount signal CI is changed greatly, it supplies a reset signal Rs to the judging section 11.

The judging section 11, when receiving this reset signal Rs, is adapted to reset a sub tap coefficient holding section 10. Therefore, the sub tap coefficient holding section 10, if a state of the echo path 14 is changed suddenly in the course of operations, captures a tap coefficient to be held by a main tap coefficient holding section. That is, the sub tap coefficient holding section 10 is adapted to capture the tap coefficient used to obtain a pseudo echo Se to respond to the changed state of the echo path 14.

As described above, by having two tap coefficient holding section, including the main tap coefficient holding section and the sub tap coefficient holding section, the following effects can be achieved.

1. Even if the tap coefficient to be fed to the adaptive digital filter 7 diverges due to ambient noises, the filter 7 is able to maintain normal operations owing to the tap coefficient held by the sub tap coefficient holding section.
2. When the state of the echo path is changed, since the sub tap coefficient holding section can be reset, it becomes possible to hold the tap coefficient corresponding to the change in the state of the echo path.

Second Embodiment

The echo cancellor of this embodiment is so configured that it has two pseudo transmission characteristics so as to be able to output one pseudo echo based on the tap coefficient held by the main tap coefficient holding section and the other pseudo echo based on the tap coefficient held by the sub tap coefficient holding section. The sub tap coefficient holding section is used to make a copy of the tap coefficient held by the main tap coefficient holding section and hold it. This copying is carried out each time an echo suppressing rate is increased. Therefore, in the sub tap coefficient holding section is always held the tap coefficient having the high echo suppressing rate. In this state, if an abnormal state occurs, e.g., an ambient noise such as the alarm of whistle of the vehicle is mixed, generation of the pseudo echo by the tap coefficient held by the main tap coefficient holding section is halted and the pseudo echo is generated by the tap coefficient held by the sub tap coefficient holding section.

Figure 3:
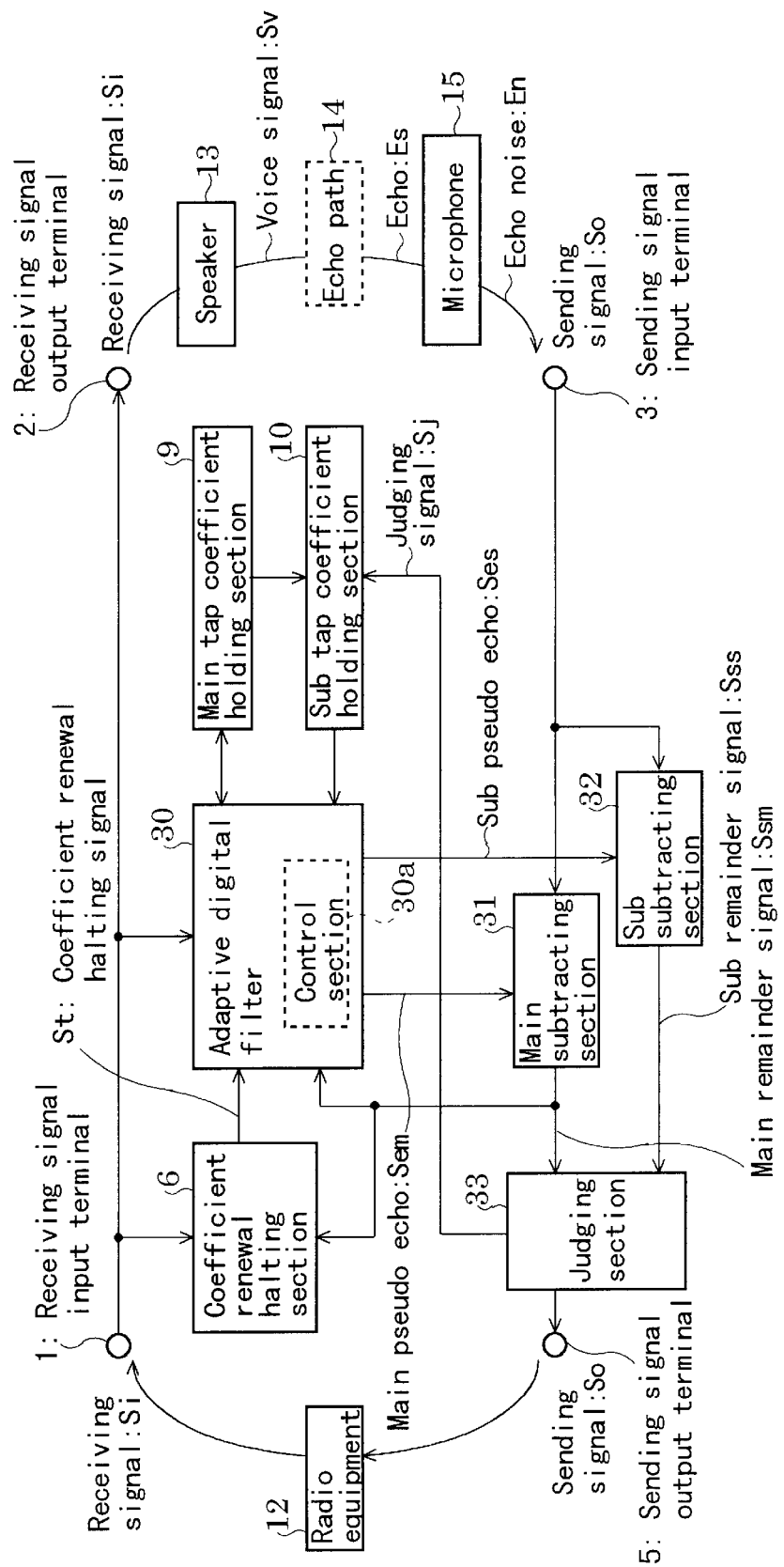
FIG. 3 is a block diagram of the echo cancellor according to a second embodiment of the present invention.

FIG. 3 is a block diagram of the echo cancellor according to a second embodiment of the present invention. As depicted in FIG. 3, the echo cancellor of this embodiment is comprised of a receiving signal input terminal 1, a receiving signal output terminal 2, a sending signal input terminal 3, a sending signal output terminal 5, a coefficient renewal halting section 6, a main tap coefficient holding section 9, a sub tap coefficient holding section 10, an adaptive digital filter 30, a math subtracting section 31, a sub subtracting section 32 and a judging section 33.

Only components being different from those provided in the first embodiment are described below.

The adaptive digital filter 30 is provided internally with a control section 30a and two transversal filters, and each of the transversal filters is operated mimicking transmission characteristics of an echo path 14 when each of tap coefficients held by the main tap coefficient holding section 9 and the sub tap coefficient holding section 10 is captured by the control section 30a. Accordingly, each of the transversal filters, when receiving part of a receiving signal Si, is adapted to output a main pseudo echo Sem based on the tap coefficient captured from the main tap coefficient holding section 9 and a sub pseudo echo Ses based on the tap coefficient captured from the sub tap coefficient holding section 10.

Moreover, the adaptive digital filter may be so configured that it is provided with only one high-speed transversal filter that can allow mimicking of the two transmission characteristics of the echo path 14 by alternately using the tap coefficients held by the main tap coefficient holding section 9 and the sub tap coefficient holding section 10.

The main subtracting section 31 is used to subtract the main pseudo echo Sem to be received from the adaptive digital filter 30 from a sending signal So containing an echo noise En inputted from the sending signal input terminal 3. The sub subtracting section 32 is used to subtract the sub pseudo echo Ses to be received from the adaptive digital filter 30 from a sending signal So containing an echo noise En inputted from the sending signal input terminal 3.

The judging section 33 is used to receive outputs from the main subtracting section 31 (hereinafter as a main remainder signal Ssm) and outputs from the sub subtracting section 32 (hereinafter as a sub remainder signal Sss) and to transfer a remainder signal having a small residual noise to a sending signal output terminal 5. Moreover, the judging section 33 supplies a judging signal Sj to the sub tap coefficient holding section 10 when the residual amount of the echo noise of the main remainder signal Ssm is smaller than that of the sub remainder signal Sss.

Next, operations of the echo cancellor of this embodiment are hereafter described. Let it be assumed that the receiving signal input terminal 1 has received a receiving signal Si from the radio equipment 12. This receiving signal Si is outputted as a voice Sv from a speaker 13 through the receiving signal output terminal 2. This voice Sv is received by a microphone through the echo path 14 and becomes an echo noise. The sending signal So mixed with the echo noise is outputted to the main subtracting section 31 and the sub subtracting section 32. Part of the sending signal Si is supplied simultaneously to the adaptive digital filter 30.

In the adaptive digital filter 30, the control section 30a is adapted to capture each of the tap coefficients held by the main tap coefficient holding section 9 and by the sub tap coefficient holding section 10 and have each of the transversal filters operate mimicking transmission characteristics of the echo path 14. Accordingly, the adaptive digital filter 30 serves to supply the main pseudo echo Sem and the sub pseudo echo Ses to the main subtracting section 31 and the sub subtracting section 32 respectively.

The main subtracting section 31, after subtracting the main pseudo echo Sem from the sending signal So mixed with the echo noise En, outputs the main remainder signal Ssm to the judging section 33. The sub subtracting section 32, after subtracting the sub pseudo echo Ses from the sending signal So mixed with the echo noise En, outputs the sub remainder signal Sss to the judging section 33. Also, part of the main remainder signal Ssm is supplied to the adaptive digital filter 30. In the adaptive digital filter 30, the control section 30a, when receiving this main remainder signal Ssm, performs a computation on the tap coefficient on the basis of the main remainder signal Ssm by referring to the receiving signal Si. The obtained tap coefficient is held by the main tap coefficient holding section 9.

The judging section 33 into which the main remainder signal Ssm and the sub remainder signal Sss are inputted is adapted to compare these two remainder signals and to transfer the remainder signal having a smaller residual echo noise to the sending signal output terminal 5. Furthermore, the judging section 33, when the residual amount of the echo noise is smaller than that of the sub remainder signal Sss, outputs a judging signal Sj to the sub tap coefficient holding section 10. The sub tap coefficient holding section 10, when receiving this judging signal Sj, makes a copy of the tap coefficient held at this point by the main tap coefficient holding section 9 and holds it. Therefore, the sub tap coefficient holding section 10 is adapted to hold the tap coefficient given when the echo suppressing rate has reached extremely the maximum limit.

Next, let it be assumed that an ambient noise such as an alarm whistle of a vehicle is mixed in the sending signal So. The ambient noise such as the alarm whistle of the vehicle, since it is not suppressed by the sub subtracting section 31, is outputted to the adaptive digital filter 30 in a state where the ambient noise is mixed in the main remainder signal Ssm. As a result, the control section 30a of the adaptive digital filter 30 performs a computation on the tap coefficient affected by the ambient noise. The tap coefficient, at the worst, may diverge. The coefficient renewal halting section 6, after detecting the ambient noise of the alarm of whistle of the vehicle or the like, outputs a coefficient renewal halting signal St to the adaptive digital filter 30. When the adaptive digital filter 30 receives the coefficient renewal halting signal St, the control section 30a stops the operation of computation on the tap coefficient. As a result, the main tap coefficient holding section 9 holds the tap coefficient existed before the ambient noise is mixed.

When the adaptive digital filter 30 receives the coefficient renewal halting signal St, the control section 30a captures the tap coefficient held by the sub tap coefficient holding section 10. One of the transversal filters is operated mimicking the transmission characteristics, causing the sub pseudo echo Ses to be outputted. Therefore, the judging section 33 selects the sub remainder signal Sss and outputs it to the radio equipment 12 through the sending signal output terminal 5. Then, the ambient noise such as alarms of vehicles stops, the adaptive digital filter 30 is restored to its normal operation.

Figure 4:
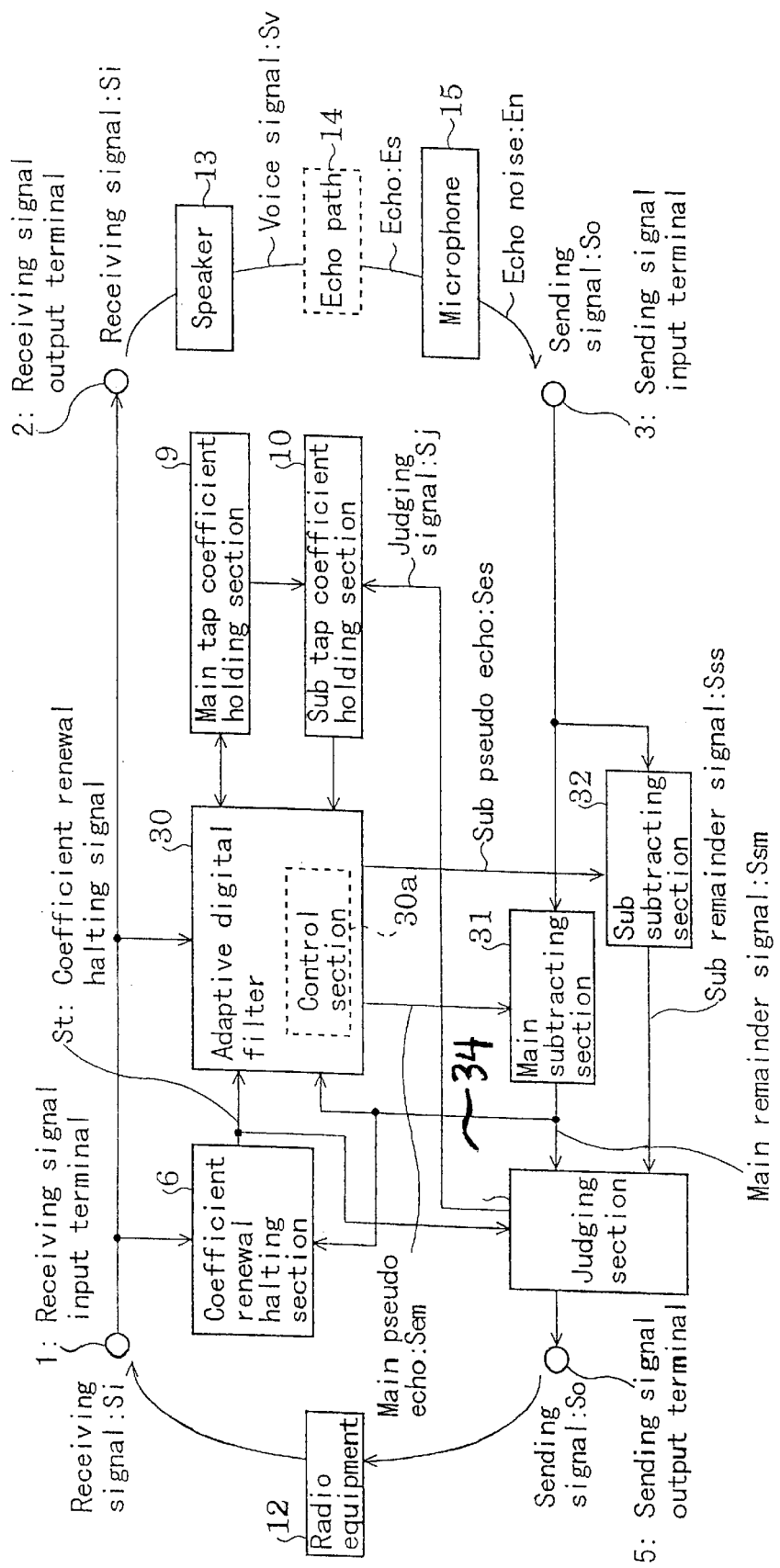
FIG. 4 is a block diagram showing a modified example of the echo cancellor according to the second embodiment.

FIG. 4 is a block diagram showing a modified example of the echo cancellor according to the second embodiment. As shown in FIG. 4, the coefficient renewal halting section 6 is adapted to output a coefficient renewal halting signal St to an adaptive digital filter 30 and a judging section 34. Owing to this configuration, the judging section 34, when receiving the coefficient renewal halting signal St, without comparing it with a main remainder signal Scm, outputs a sub remainder signal Sss to a radio equipment 12 through a sending signal output terminal 5.

Referring to FIG. 4, the judging section 34, if a level of the main remainder signal Ssm is low, outputs a judging-signal Sj, and even if a level of an echo noise En instantaneously is changed due to a change in the state of an echo path 14, outputs the judging signal Sj if its change exceeds a specified level. That is, if the state of the echo path 14 is changed and an echo noise En is increased, a residual amount of the main remainder signal Ssm becomes large. Because of this, in the embodiment shown in FIG. 3, the tap coefficient corresponding to the echo noise existed before a change in the level of the echo noise remains held by the sub tap coefficient holding section 10.

In the modified example shown in FIG. 4, if the echo noise En is varied due to the change in the state of the echo path 14, since a level of the main remainder signal Ssm is instantaneously and greatly changed, the judging section 34 outputs a judging signal Si. Therefore, the sub tap coefficient holding section 10 captures the tap coefficient held by the main tap coefficient holding section 9. The captured tap coefficient is obtained through the computation performed by the control section 30a on the basis of the main remainder signal Ssm containing the increased echo noise En. Accordingly, the sub tap coefficient holding section 10 is adapted to instantaneously hold the tap coefficient from which a sub pseudo echo corresponding to the changed state of the echo path 14 is obtained.

As described above, even if the tap coefficient diverges due to ambient noises, since the pseudo echo is generated by the tap coefficient held by the sub tap coefficient holding section which is operating normally at the same time.

Third Embodiment

Figure 5:
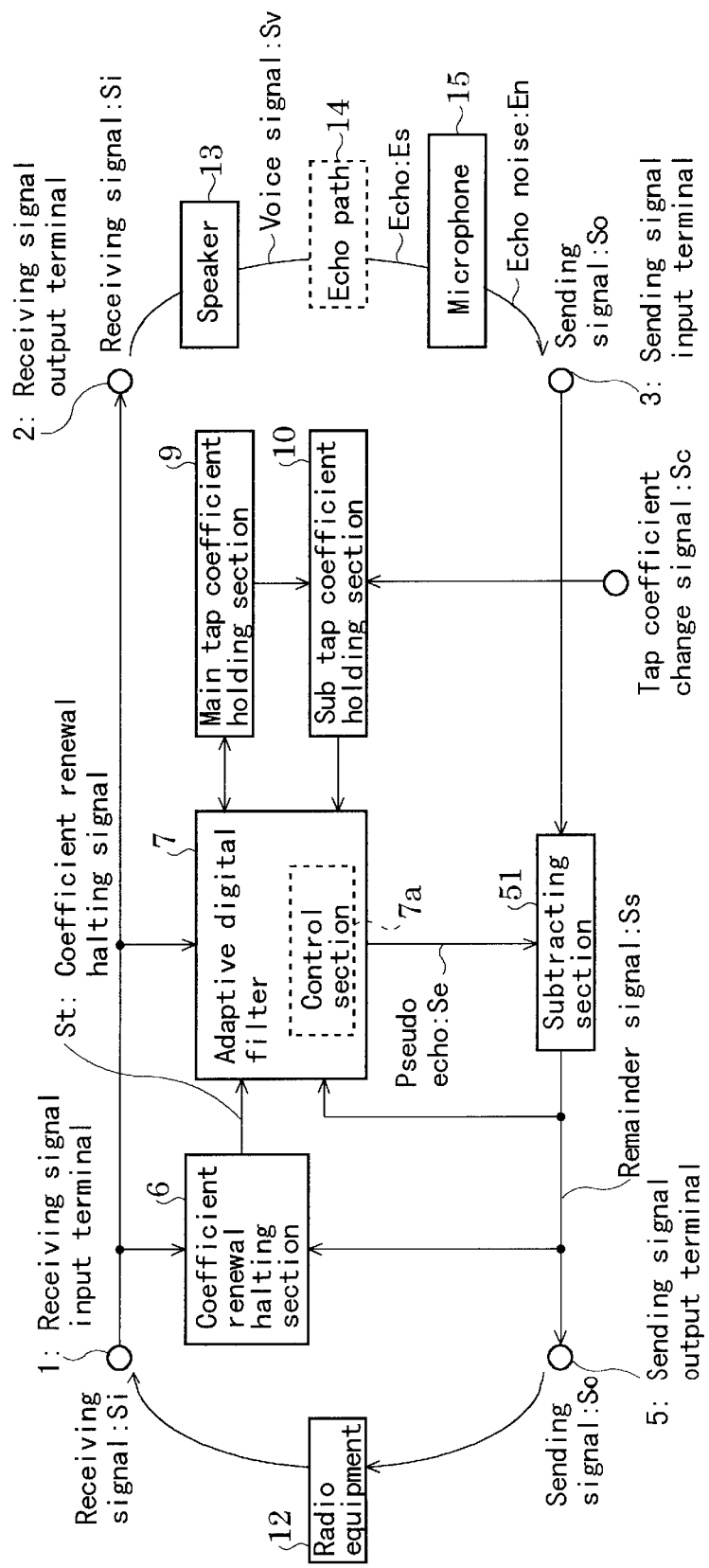
FIG. 5 is a block diagram of an echo cancellor according to a third embodiment of the present invention.

FIG. 5 is a block diagram of an echo cancellor according to a third embodiment of the present invention. As shown in FIG. 5, the echo cancellor of this embodiment is comprised of a receiving signal input terminal 1, a receiving signal output terminal 2, a sending signal input terminal 3, a subtracting section 51, a sending signal output terminal 5, a coefficient renewal halting section 6, an adaptive digital filter 7, a main tap coefficient holding section 9 and a sub tap coefficient holding section 10. Only components being different from those provided in the first embodiment are described below.

In the case of the first embodiment (in FIG. 1), the sub tap coefficient holding section 10 is adapted to automatically receive the judging signal Sj from the judging section 11. Each time the sub tap coefficient holding section 10 receives the judging signal Sj, it captures the tap coefficient held by the main tap coefficient holding section 9 and holds it.

Unlike in the case of the first embodiment, in this third embodiment, a tap coefficient change signal Sc fed from the outside, instead of the judging signal Sj, is outputted to the sub tap coefficient holding section 10. The tap coefficient holding section 10, each time it receives this change signal Sc, makes a copy of the tap coefficient held by the main tap coefficient holding section 9 and holds its value. The change signal Sc is outputted by other control section disposed outside or manual means of an operator. Except these, configurations and operations of the echo cancellor is the same as in the case of the first embodiment. This configuration can be applied in combination with those of the first and second embodiments.

The following effects can be obtained by controlling the operation of making a copy of the tap coefficient held by the main coefficient holding section. The operator can adjust the influence caused by ambient noises in terms of voices by judging from actual voices.

Fourth Embodiment

Figure 6:
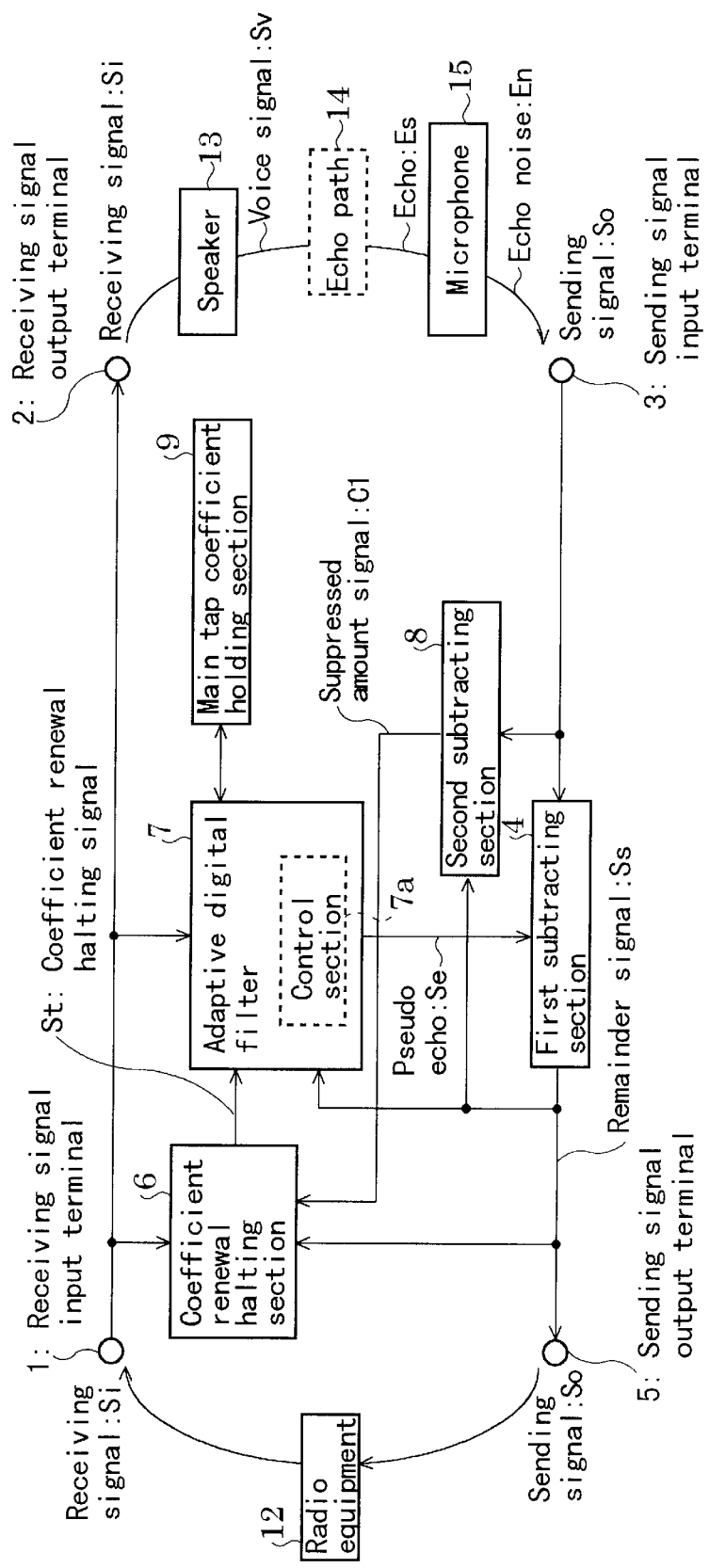
FIG. 6 is a block diagram of an echo cancellor according to a fourth embodiment of the present invention.

FIG. 6 is a block diagram of an echo cancellor according to a fourth embodiment of the present invention. As depicted in FIG. 6, the echo cancellor of the fourth embodiment is provided with a receiving signal input terminal 1, a receiving signal output terminal 2, a sending signal input terminal 3, a first subtracting section 4, a sending signal output terminal 5, a coefficient renewal halting section 6, an adaptive digital filter 7, a second subtracting section 8 and a main tap coefficient holding section.

Only components being different from those provided in the first embodiment are described below.

In the first embodiment (in FIG. 1), the second subtracting section 8 is used to transfer a suppressed amount signal C1 to the judging section 11 (in FIG. 1). The judging section 11 (in FIG. 1), when receiving the suppressed amount signal C1, outputs a judging signal Sj to a sub tap coefficient holding section 10 each time the suppressed amount signal C1 becomes large. The sub tap coefficient holding section 10 (in FIG. 1) is used to make a copy of the tap coefficient held by the main tap coefficient holding section 9 and to hold the value each time the section 10 receives the judging signal Sj from the judging section 11 (in FIG. 1).

Unlike in the case of the first embodiment, the echo cancellor of the fourth embodiment is not provided with the sub tap coefficient holding section 10 and the judging section 11 as shown in FIG. 1. The second subtracting section 8 is used to output the suppressed amount signal C1 to a tap coefficient renewal halting section 6. The tap coefficient renewal halting section 6 is used to receive this suppressed amount signal C1 and to monitor its power level and, when the state of the echo path is changed and becomes a specified threshold value or less, it transfers a tap coefficient renewal halting signal St to the adaptive digital filter. The adaptive digital filter 7, when it receives the tap coefficient renewal halting signal St, stops the renewal of the tap coefficient of the main tap coefficient holding section 9. Therefore, the adaptive digital filter 7 continues to maintain transmission characteristics existed immediately before it receives the coefficient renewal halting signal St and, after stopping the receipt of the tap coefficient renewal halting signal St, it again starts the renewal of the tap coefficient.

As described above, following effects can be obtained by monitoring of the suppressed amount signal carried out by the coefficient renewal halting section, by a transfer of the tap coefficient renewal halting signal St to the adaptive digital filter performed when the level of the signal St becomes a threshold value or less and by a stop of renewal of the tap coefficient held by the main tap coefficient holding section 9.

1. It is made possible to prevent a tap coefficient from diverging at the time of a bidirectional call and to maintain a good speech quality.
2. It is made possible to respond to a change in the state of the echo path and to achieve an echo cancellor with a good traceability.

It is apparent that the present invention is not limited to the above embodiments but may be changed and modified without departing from the scope and spirit of the invention.

What is claimed is:

1. An echo canceller for suppressing an echo noise mixed in a sending signal, said echo noise caused by an echo produced by passage of a voice through an echo path used as a specified path for said voice, the echo canceller comprising:

an adaptive digital filter that captures a tap coefficient used to mimic a transmission characteristic responsive to said echo path, establishes a pseudo transmission characteristic based on the captured tap coefficient, outputs a pseudo echo for canceling said echo noise, and calculates and outputs a new tap coefficient based on a residual amount of said echo noise existing after canceling;

a main tap coefficient holding section that replaces a currently held tap coefficient with said new tap coefficient, for subsequent capture by said adaptive digital filter;

a sub tap coefficient holding section that copies and holds a tap coefficient from said main tap coefficient holding section when echo suppression increases;

an ambient noise detector that detects ambient noises mixed in said sending signal and outputs a detection signal indicative thereof; and a controller that controls said adaptive digital filter to capture the tap coefficient held by said sub tap coefficient holding section responsive to said detection signal.

2. The echo canceller according to claim 1, further comprising:

a judging section that judges when the residual amount of said echo noise existing after canceling becomes small, to control copying by said sub tap coefficient holding section; and an echo path change detector that detects variation of said echo noise caused by a change in state of said echo path, and controls said judging section to reset said sub tap coefficient holding section to copy and hold a tap coefficient held by said main tap coefficient holding section responsive to the change in state.

3. An echo canceller for suppressing an echo noise mixed in a sending signal, said echo noise caused by an echo produced by passage of a voice through an echo path used as a specified path for said voice, the echo canceller comprising:

an adaptive digital filter that captures first and second tap coefficients used to mimic a transmission characteristic responsive to said echo path, establishes two pseudo transmission characteristics based on each of said captured tap coefficients, outputs a main pseudo echo and a sub pseudo echo used to cancel said echo noise, and calculates and outputs a new tap coefficient based on a residual amount of said echo noise existing after canceling said echo noise with said main pseudo echo;

a main tap coefficient holding section that replaces a currently held tap coefficient with said new tap coefficient, for subsequent capture as the first tap coefficient used by said adaptive digital filter to output said main pseudo echo;

a sub tap coefficient holding section that copies and holds a tap coefficient from said main tap coefficient holding section as the second tap coefficient used by said adaptive digital filter to output said sub pseudo echo;

a sending signal judging section that compares a first version of the sending signal having said echo noise canceled by said main pseudo echo to a second version of the sending signal having said echo noise canceled by said sub pseudo echo, selects and outputs the version of the sending signal having a smaller residual amount of said echo noises, and controls said sub tap coefficient holding section to copy and hold the tap coefficient from said main tap coefficient holding section each time the first version of the sending signal is selected;

an ambient noise detector that detects ambient noises mixed in said sending signal and outputs a detection signal indicative thereof; and a controller that controls said adaptive digital filter to capture the tap coefficient held by said sub tap coefficient holding section responsive to said detection signal.

4. An echo canceller comprising:

a main tap coefficient holding section that holds a tap coefficient;

an adaptive digital filter that generates a pseudo echo signal using the tap coefficient held in said main tap coefficient holding section;

a canceling section that cancels the echo noise in the sending signal responsive to the pseudo echo signal to provide a remainder signal, said adaptive digital filter generates a new tap coefficient based on a residual amount of echo noise existing in the remainder signal, the tap coefficient in said main tap coefficient holding section being replaced by the new tap coefficient after the canceling;

a sub tap coefficient holding section that copies and holds a tap coefficient from said main tap coefficient holding section, responsive to a control signal;

an ambient noise detector that detects ambient noise in the remainder signal and generates a detection signal indicative thereof; and a controller that controls said adaptive digital filter to generate the pseudo echo signal based on the tap coefficient copied in said sub tap coefficient holding section, upon receipt of the detection signal.

5. The echo canceller of claim 4, further comprising a judging section that judges when the residual amount of echo noise existing in the remainder signal after the canceling becomes smaller, and provides the control signal responsive thereto.

6. The echo canceller of claim 5, wherein the echo noise is caused by an echo produced by passage of a voice through an echo path used as a specified path for the voice, the echo canceller further comprising:

an echo path change detector that detects variation of the echo noise caused by a change in state of said echo path, and that controls said judging section to reset said sub tap coefficient holding section to thereby copy and hold a tap coefficient held by said main tap coefficient holding section responsive to the change in state.

7. The echo canceller of claim 4, wherein the control signal is an externally provided signal indicative of a change in the tap coefficient.

8. The echo canceller of claim 4, wherein said adaptive digital filter further generates a sub pseudo echo signal using the tap coefficient held in said sub tap coefficient holding section, the echo canceller further comprising:

a second canceling section that cancels the echo noise in the sending signal responsive to the sub pseudo echo signal to provide a second remainder signal; and a judging section that selects one of the remainder signal and the second remainder signal that has a smaller residual echo noise therein, outputs the selected signal as an echo canceled signal, and provides the control signal to said sub tap coefficient holding section each time the remainder signal is the selected signal.

9. The echo canceller of claim 8, wherein said judging section automatically outputs the second remainder signal as the echo canceled signal when the detection signal is generated.

10. The echo canceller of claim 4, wherein upon receipt of the detection signal, said controller controls said adaptive digital filter to stop generation of a new tap coefficient.

11. An echo canceller comprising:
- a main tap coefficient holding section that holds a tap coefficient;
- an adaptive digital filter that generates a pseudo echo signal using the tap coefficient held in said main tap coefficient holding section;
- a canceling section that cancels the echo noise in the sending signal responsive to the pseudo echo signal to provide a remainder signal,
- said adaptive digital filter generates a new tap coefficient based on a residual amount of echo noise existing in the remainder signal after the canceling, the tap coefficient in said main tap coefficient holding section being replaced by the new tap coefficient after the canceling;
- a noise suppression detector that detects an amount of noise in the remainder signal suppressed by the canceling, and provides a suppression amount signal indicative thereof;
- a coefficient renewal halting section that determines when a suppression amount as indicated by the suppression amount signal is equal to or less than a threshold value, and generates a tap coefficient renewal halting signal indicative thereof; and
- a controller that controls said adaptive digital filter to stop renewal of the tap coefficient and to generate the pseudo echo signal based on the tap coefficient held in said main tap coefficient holding section when the tap coefficient renewal halting signal is generated, and to resume renewal of the tap coefficient when the tap coefficient renewal halting signal is no longer generated.

12. The echo canceller according to claim 1, wherein said controller is provided as within said adaptive digital filter.

13. The echo canceller according to claim 3, wherein said sending signal judging section is coupled to said ambient noise detector and upon receipt of the detection signal, outputs the second version of the sending signal without comparing the first version of the sending signal to the second version of the sending signal.

14. The echo canceller according to claim 11, wherein the remainder signal is output as an echo cancelled version of the sending signal.

* * * * *